United States Patent [19]
Boyer et al.

[11] 3,870,808
[45] Mar. 11, 1975

[54] METHOD OF PRODUCING A MEAT SIMULATING TEXTURED FOOD PRODUCT

[75] Inventors: Robert A. Boyer, Creve Coeur; John E. Middendorf, Affton, both of Mo.

[73] Assignee: Ralston Purina Company, St. Louis, Mo.

[22] Filed: Mar. 16, 1971

[21] Appl. No.: 124,953

[52] U.S. Cl................ 426/250, 426/364, 426/205, 426/212, 426/382, 426/524, 426/802
[51] Int. Cl. ................................................ A23j 3/00
[58] Field of Search ......... 99/14, 17, 98; 260/123.5; 426/274, 289, 153, 205, 364, 373, 514

[56] References Cited
UNITED STATES PATENTS

| | | | |
|---|---|---|---|
| 3,488,770 | 1/1970 | Atkinson | 99/17 |
| 3,490,914 | 1/1970 | Okumura | 99/17 |
| 3,645,747 | 2/1972 | Palmer | 99/17 |
| 3,662,672 | 5/1972 | Hoer | 99/17 |
| 3,662,673 | 5/1972 | Boyer et al. | 426/241 |

Primary Examiner—Raymond N. Jones
Assistant Examiner—R. A. Yoncoskie
Attorney, Agent, or Firm—Virgil B. Hill; Lawrence J. Hurst

[57] ABSTRACT

A process of producing an edible textured proteinaceous product is disclosed. The product is produced by freezing a slurry of a protein source material, such as a protein isolate, to form a meaty texture in the protein material and then setting the texture of the frozen protein by heat. The resulting product has certain textural and nutritional properties of natural meat and can be cooked and substituted for flesh in the human diet. By controlling the conditions of freezing, the textural properties of the material can be varied to simulate meat products of a number of types. Process conditions which may be varied include the rate of freezing, pH, the solids content of the material, surface effects, heat exchange effects, degree of confinement, and pressure effects. The heat required to set the protein texture can be applied to a number of methods. Direct steam, retorting, baking and frying are acceptable in setting the protein structure.

13 Claims, No Drawings

METHOD OF PRODUCING A MEAT SIMULATING TEXTURED FOOD PRODUCT

BACKGROUND OF THE INVENTION

The food industry has expended a great deal of research and development effort to produce meat-like or meat simulating food materials from secondary protein sources, particularly from protein containing vegetable substances. As is known, the chief nutritional value of meat is due to its protein content. However, although meat is a desirable source of nutrient protein and is highly palatable, meat production is actually relatively inefficient in terms of feed input to food output. Furthermore, certain crops such as soybeans provide inexpensive by-products which have a high percentage of potentially available protein, but which are not normally palatable and/or edible.

Food scientists have resorted to a variety of techniques to produce meat simulating food materials from secondary protein sources, such as soybeans. One excellent technique is taught in U.S. Pat. No. 2,682,466. This technique involves the creation of a large number of small diameter spun fibers which are gathered into bundles or "tows" and then formed into various type edible products with subsequent operations. While these products are of high quality, the process is complex and expensive, so that the products must be priced in the general range of the corresponding actual meat products. In addition, the capital expense for the process equipment is relatively high per unit of output.

To reduce the cost of meat simulating protein foods, scientists have sought other techniques of fabricating secondary protein sources. Recently is has become possible to produce inexpensive protein products by an extrusion process. The process involves adding moisture to a secondary protein source material, extruding the material at elevated temperatures and pressures to produce a puffed, expanded product which may have a dry, crisp texture. An extrusion process for producing dry puffed protein products is disclosed in U.S. Pat. No. 3,496,858. The process utilizes protein sources, such as oilseed meals, normally having a protein content of about 50 percent by weight (dry basis) and a moisture content of about 30 percent by weight.

There has existed a need for other relatively inexpensive methods of treating high purity protein sources to produce a product which simulates natural meat tissue in appearance, physical structure and texture, moisture content, nutritional value, chewing and mouthfeel characteristics, and that can be practiced economically. Recently John Middendorf, an inventor herein, Alan Cornell and Doyle Waggle discovered a method of converting high purity protein sources to a simulated meat surrogate structure by freezing. The invention is disclosed and claimed in application Ser. No. 124,739 filed Mar. 16, 1971 and now abandoned entitled Protein Food Product. The present invention relates to an improved method of producing simulated meat structures or meat surrogates by freezing.

SUMMARY OF THE INVENTION

This invention provides an improved method of producing a nutritious, palatable meat simulating product having certain moisture, texture, and structural properties of natural meat materials. The product has chewing and mouthfeel characteristics similar to those of natural meat products and can be substituted for meat in a wide variety of food uses. The process is economical to operate and will produce a high protein product from high purity protein products which are derived from secondary protein sources such as low grade meats, microbial protein, proteinaceous meals, concentrates and isolates. A preferred source is oilseed protein isolate. The process can operate directly in high moisture containing products to produce a meat-like protein product, eliminating the drying step practiced for most food uses of secondary protein source isolate materials and reducing the expense of the process of producing a high protein meat simulating product.

Oilseed protein isolates, such as high purity soy isolates, typically have a moisture content of about 60 – 70 percent or more by weight or greater after extraction. The wet extracted material is a thick, viscous slurry or "curd." By freezing the curd under controlled conditions, a meat-like texture can be imparted to the curd; by setting the texture of the curd with heat, the texture is permanently fixed in the protein to produce a food product having a moisture content approximately that of a natural food product, such as meat, about 60 – 70 percent or more by weight. Reconstituted dried curd will also work in the process of this invention, but the cost is increased by the cost of drying and rehydrating the curd.

The method of producing a frozen texture product involves adjusting a protein curd material to the isoelectric range for the protein employed, i.e. about pH 4 – 6 for soy protein, and freezing the material. As the water in the protein slurry freezes, it forms ice crystals which set up forces in the curd mass which can be controlled to form meat-like textures in the precipitated protein. When the meat-like structures are formed in the protein, the protein is set by heating. The heating can be accomplished by direct steam, by retorting, boiling, or a variety of conventional heat exchange steps.

As a consequence, it is an object of this invention to provide a novel method of producing a meat simulating protein product.

It is an object of this invention to provide a novel process of producing a proteinaceous product from protein sources which has the moisture, texture, and organoleptic properties of a natural food product.

It is an object of this invention to provide a novel process for directly converting isolated protein curd into a nutritious palatable meat substitute.

It is an object of this invention to provide a novel process for utilizing soy protein material to produce a product which has certain nutritional and organoleptic properties comparable to those of natural meat.

It is an object of this invention to upgrade and increase the desirability of cheap, rough, or otherwise undesirable portions of meat. Meat as used herein is intended to include ordinary meats such as red meats, beef, lamb, pork, and fowl, fish or sea food.

It is a further object of this invention to produce a novel protein product from secondary protein sources which is an inexpensive meat substitute.

DESCRIPTION OF THE PREFERRED EMBODIMENTS

The concept of this invention pertains broadly to a unique processing treatment of protein source products to obtain a meat simulating or meat surrogate food material. Coarse or rough meat cuts may be upgraded by the process of the invention, as can secondary protein source materials. In particular, the invention pertains to a unique processing treatment of protein isolates and concentrates obtained from secondary protein sources to obtain a meat replacing and simulating food material. Secondary protein sources include by-product and waste meat sources; the proteinaceous by-products such as meat and poultry meal; the oilseeds such as soybean and cottonseed; and microbial protein sources such as torula yeast, brewer's yeast, and petro protein; and combinations of the preceding. The most beneficial results are achieved when the novel concept is applied to isolated soy protein, since it is readily available and highly nutritious source. In fact, by properly treating isolated soybean curd according to this invention, a top grade product can be obtained which closely simulates the properties of natural meat.

To obtain a protein concentrate or an isolate from a secondary protein source, it is necessary to separate the non-proteinaceous materials at least in part from the protein with which it is associated in the source. When producing a protein isolate from an oilseed, such as soybeans, a chemical precipitation and separation is usually employed. Typically, whole soybeans are crushed or grounded in convenient fashion and passed through a conventional oil expeller. However, the oil is preferably removed by solvent extraction, using solvents normally employed for this purpose.

The resulting solids, commonly referred to as soybean meal, and normally in the form of flakes, contain many ingredients including complex proteins, sugars, fibers and others. The porteins and sugars are then preferably dissolved out of the solids. This may be done by adding the flakes to an aqueous bath and adding a food grade alkaline material to raise the pH substantially above 7. Typical of such alkaline reagents is sodium hydroxide, potassium hydroxide, calcium hydroxide or other commonly accepted food grade alkaline reagents. The material is then extracted for a period of time sufficient to put the proteins and sugars in solution, usually about 30 minutes or so. The resulting liquor solution is separated from the solids, as by passing the material through a screen and/or centrifuging. Preferably, the liquor is then cycled through a clarifier to remove tiny particles.

The soy proteins are then precipitated from the liquor by lowering the pH to an acidic value of the isoelectric point of the protein, usually pH of 4.6 – 4.9, with the addition of a common food grade acidic reagent such as acetic acid, phosphoric acid, citric acid, tartaric acid or others. The precipitate is then separated as by centrifuging and washed with water to remove remaining sugars, except for a minute trace which is practically impossible to remove. The precipitated curd is a viscous aqueous slurry containing between about 90 and 98 percent by weight protein on a dry basis and between about 60 and 90 percent by weight water. The slurry as pretreated forms the most desirable product with respect to the characteristics presently sought, when subsequently treated in the manner to be described.

This slurry can then be further processed as described in detail hereinafter. However, it is significant to note that this slurry of isolated soy protein can alternatively be dried, and then subsequently rehydrated and further processed in the same manner, as described hereinafter. Drying of the isolated soy protein is preferably by a flash dry technique such as spray drying or the equivalent, due to retention of redispersion capacity. The dried material may be stored for a period of time or immediately reslurried for further processing. It has been found that the dried reslurried material results in a slightly different final product than the final product resulting when the isolated protein slurry is directly processed further. The technical explanation of this is not fully understood.

The precipitated protein slurry, the reconstituted dried protein, or other protein source must have its pH adjusted to within the isoelectric range for the protein, usually between about 4 – 6 for soybean or preferably between 4.6 – 4.9. Normally, if a precipitated protein isolate slurry is used, the precipitation pH will be satisfactory for further processing. If other materials are used, the pH may be adjusted by using a common food grade reagent.

The slurried, precipitated protein or the reconstituted dried protein having a protein purity of from 90 – 98 percent by weight of solids and a solids content of from about 10 – 40 percent by weight is used in the process of this invention. Preferably, the material has a solids content of above about 20 percent by weight and a protein purity of at least 95 percent by weight on dry weight basis. The slurry of protein or curd is confined in a container or on a surface and subjected to heat exchange to cool the material until the material is frozen. The freezing process should preferably take place over a time period of not less than about five minutes to provide the desired structure in the proteinaceous material. The freezing is preferably accomplished at a relatively slow rate as opposed to blast freezing or immersion techniques to allow for a relatively slow crystal growth so that fairly large ice crystals are formed. The stresses produced in the protein by the large crystal growth crystalline mold the proteinaceous material into layers or stria and results in the formation of the fibrous, meat-like texture in the product. The crystals expand forcing areas of the proteinaceous material apart creating voids in the proteinaceous material occupied by the ice crystals and compacting other areas of the protein to form a dense crystalline-molded meat-like structure. The structure formed has dense proteinaceous areas similar to the fibrous muscle tissue areas found in natural meats such as ham, poultry and fish. Of course, faster freezing rates may be used, especially if a very fine texture is desired.

The characteristics of the meat simulating material can be modified or improved by the addition of other materials to the proteinaceous slurry prior to freezing. Various flavoring, coloring, and texture improving materials can be used in the process. For example, meat, meat flavors, colors, or fat could be dispersed in the slurry prior to freezing to product products which closely simulate a wide variety of natural meat products in taste, texture, appearance, and nutritional properties. By adding beef fat, lean beef and proper colors to a proteinaceous slurry, it is possible to produce surrogate products closely simulating steaks, roasts, and other beef products. This is particularly advantageous where low quality materials, such as rough or cheap cuts of meat, can be used to product meat surrogate products which closely simulate the taste structure, appearance, and nutritional properties of more palatable and more expensive food materials.

After the structure has been formed in the proteinaceous material, the material is subjected to a heat exchange to set the structure in the protein by heat. The mass of the material should be heated to a temperature sufficiently high to allow the mass to irreversibly set. Depending on the size and shape of the proteinaceous mass, the temperature will vary from the mimimum required to set the protein to a maximum above which the protein will burn and/or degrade. Structures made from soy protein are preferably heated to a temperature between about 150° – 375° F., preferably above 180° F., for a period between 5 minutes to an hour or more. The heating must take place rapidly enough to set the protein before the structure melts or breaks down. Direct steam, autoclaving, frying, boiling, or other conventional heating methods may be used to perform the heating step, provided they heat the protein rapidly enough to set the structure. In addition to setting the protein in the formed structure, the heat melts the ice crystals which occupy the spaces between the proteinaceous areas, leaving vacant areas which provide definite boundaries or marking for the proteinaceous areas. The dense proteinaceous areas having definite markings are highly similar to the well defined myofibrillar muscle tissue in natural meat such as red meat, fish, poultry, etc.

Once the proteinaceous material has been set by heat, it becomes insoluble and does not return to solution in water. Consequently, the product can be used in aqueous foods such as soups, sauces, and stews without losing its meat-like properties.

The properties of the finished product can be varied by the conditions and type of heating step used and it may be advantageous to use a particular heating method in some processes to achieve a desired result. For example, autoclaving can be used to great advantage where the finished textured protein is to be used in a final canned food product. The protein curd can be given the texture of a natural meat source such as ham, tuna, or chicken by freezing the curd. The frozen textured protein can then be blended with other food materials, such as vegetables, eggs and sauces to prepare a ham, tuna, or chicken salad type product and the blended product can be filled and sealed into containers such as metal cans and autoclaved. The heat from the autoclave serves to set the textured structure in the protein and sterilize the salad product at the same time. Of course, the protein can be heat set prior to mixing if desired.

A number of food grade reagent chemicals may be added to the protein isolate material to influence the texture of the resulting protein product and to increase its utility in protein food products. The toughness of the protein and the fineness or coarseness of the protein structure can be modified by the addition of food grade chemicals such as sodium, potassium, and calcium salts such as sodium chloride, potassium chloride, trisodium phosphate, calcium chloride and other food grade reagents. Normally, the reagents would be added in a sufficiently low quantity that the resulting product would not be unpalatable and ice crystal formation would not be hampered. Typically, the amount of reagent added would be between 0 and 3 percent by weight. A preferred range would be between 1 and 2 percent by weight.

Although the inventive concepts will be readily understood from the following description by one having ordinary skill in the art, the following examples are given to assure a complete understanding:

EXAMPLE 1:

Clean dehulled soybeans were ground and the oil extracted with hexane to give flakes, commonly called defatted soybean meal. The flakes were added to an aqueous bath and a food grade alkaline reagent, calcium hydroxide, was added until a pH of 10 was reached. The material was extracted for 30 minutes and then centrifuged to clarify the extract. The protein material was precipitated from the clarified liquor by adding phosphoric acid until the a 20 percent point was reached at a pH of about 4.7. The precipitate was washed with water and centrifuged to concentrate the protein isolate. The isolate had a solids content of 24 percent by weight and a protein purity of 96 percent on a solids basis. A meat flavored protein material was prepared from the isolated protein by mixing 100 grams of the isolated soy protein slurry, 50 grams of emulsified raw beef flank meat (40 percent fat), 20 grams water, and 2.5 cc. of a solids aqueous solution of trisodium phosphate. The mixture had a pH of 5.2. The mixed material was frozen at −5° F. overnight in a cylindrical beaker. The frozen mixture was removed from the beaker and was observed to have a fibrous texture resembling animal muscle tissue. The texture was set by heating the textured material to about 200° F. in a steam atmosphere for 45 minutes. The resulting solid product had a striated, myofibrillar meat-like texture and taste resembling a filet mignon.

EXAMPLE 2:

A tuna flavored protein product was prepared by mixing 100 grams of soy protein isolate slurry (24 percent by weight solids), 100 grams of emulsified raw tuna, 20 cc. of water, and 2.5 cc. of a 20 percent solids solution of trisodium phosphate. The mixed material had a pH of 5.4. The mixture was sealed in a 7 oz. tuna can and frozen at −5° F. for 3 hours. The frozen material was then heated for 40 minutes to about 240° F. in an autoclave. The heat set product was cooled and marinated for 60 minutes in a 10 percent salt solution. The brined material was then marinated for 60 minutes in vegetable oil. The final product had a flake-like, light fibrous texture similar to canned tuna and had a light, tuna flavor, chew and mouthfeel.

EXAMPLE 3:

A ham salad material was prepared by mixing 100 grams of isolated soy protein slurry (24 percent by weight solids), 50 grams of emulsified ham, 20 grams of water, and 2.5 cc. of a 20 percent solids solution of trisodium phosphate. The mixture had a pH of 5.3. The mixed material was frozen at −5° F. for 5 hours in a beaker. The frozen mixture was then heated to about 200° F. for 60 minutes to set the protein structure into an insoluble form. The set structure was cubed and mixed with:

one-half cup chopped celery
2 hard boiled eggs, sliced
1 tablespoon lemon juice and coated with mayonnaise to form a ham salad simulating product. The cubed product had taste, chew and mouthfeel characteristics similar to ham tissue and had a striated, meat-like texture. The ham salad product formed from the structure was very palatable and provided a nutritious meat food product.

EXAMPLE 4:

A spray dried soy protein isolate obtained from the Ralston Purina Company under the trade name of Edipro N was slurried with water at a concentration of about 20 percent by weight. The slurry had a pH of 6.9. The pH was then adjusted to 5.2 using a solution of hydrochloric acid. One hundred grams of the slurry was then mixed with 100 grams of emulsified beef chuck (40 percent solids) and 0.3% NaCl was added. The mixed material had a pH of 5.2. The mixture was frozen at −5° F. overnight in a cylindrical beaker. The frozen mixture was removed from the beaker and was observed to have a fibrous texture resembling animal muscle tissue. The mixture was set by heating a textured material to about 200° F. in a steam atmosphere for 45 minutes. The resulting product had a striated meat-like myofibrillar texture similar to that of the product of Example 1.

EXAMPLE 5:

The spray dried soy protein used in Example 4 was slurried with water at a concentration of about 20 percent by weight. The slurry had a pH of 6.9. Two percent NaCl was added to the slurry. Two hundred grams of the slurry was frozen at −5° F. overnight in a cylindrical beaker. The frozen mixture was removed from the beaker and was observed to have a glassy, granular texture, which although it possessed some fibrous muscle simulating properties, was not as satisfactory as the material produced in Examples 1 and 4. The texture was set by heating the material to about 200° F. in a steam atmosphere for 45 minutes. The resulting product had a granular, glassy gel-like structure, which although it had some fibrous meat-like properties, did not exhibit the superior texture of the products produced in Examples 1 and 4.

EXAMPLE 6:

Two pounds of coarse low grade chuck roast meat was emulsified on a Colloid mill. The emulsified material had a solids content of 40 percent and a pH of 6. The pH of the emulsified slurry was adjusted to 5.2 using a hydrochloric acid solution. Two hundred grams of the material was frozen at −5° F. overnight in a cylindrical beaker. The frozen mixture was removed from the beaker and observed to have a striated texture. The texture was set by heating the frozen material to about 200° F. in a steam atmosphere for 45 minutes. The resulting product had a striated meat-like myofibrillar texture similar to that obtained in the product of Example 1. When cut and eaten, it was found that the product possessed superior texture and taste properties comparable to those of high grade meat cuts such as filet mignon or a good beef roast.

EXAMPLE 7:

Two hundred grams of the soy isolate material obtained as described in Example 1 and having a pH of 4.7 was frozen at −5° F. overnight in a cylindrical beaker. The frozen mixture was removed from the beaker and heat set at 200° F. in a steam atmosphere for 45 minutes. The resulting product had a striated meat-like myofibrillar texture similar to that of the product of Example 1 and could not be distinguished on the basis of texture from a natural meat product.

In view of the above illustrative examples, it is believed that this invention will be readily understood by one skilled in the art, including the reasonable equivalents of the details disclosed and it is considered that the invention is not to be specifically limited to the embodiments disclosed as illustrative of the invention, but rather is to be defined by the scope of the appended claims and all reasonable equivalents.

We claim:

1. A method of producing a meat simulating textured food product from protein sources comprising the steps of: forming an aqueous slurry of the proteinaceous material having a solids content of about 10 – 40 percent by weight, controlling the pH of the proteinaceous slurry to between about 4 and 6, confining the proteinaceous slurry, freezing the proteinaceous slurry to form ice crystal layers in said slurry thereby compressing and molding the protein material of the slurry into layers spaced apart by the ice crystals and heat setting the protein layers into an irreversible substantially insoluble form by heating the frozen slurry to a temperature sufficiently high to allow the protein layers to irreversibly set and lower than a temperature at which the protein will degrade thereby melting the ice crystal layers to produce the meat simulating textured food products.

2. The method of claim 1 wherein the temperature to which the slurry is heated for heat setting the protein layers is above about 150° F.

3. The method of claim 1 wherein the heating for heat setting the protein layers is for between about 5 minutes and 1 hour.

4. The method of claim 1 wherein the protein source is isolated soy protein.

5. The method of claim 1 wherein the protein source is emulsified meat.

6. The method of claim 1 wherein the protein source is a mixture of isolated soy protein with emulsified meat or emulsified raw tuna.

7. The method of claim 1 wherein the texture of the protein structure formed is modified by the addition of a food grade reagent to the proteinaceous material.

8. The method of claim 1 wherein a modifying material selected from the group consisting of coloring agents, flavors and fat is added to the protein slurry.

9. A method of preparing a textured protein food product having an arrangement of striated protein layers comprising the steps of:

a. forming an aqueous slurry of proteinaceous material having a solids content of about 10 – 40 percent by weight, the slurry having a pH between about 4 and 6, b. freezing an aqueous slurry of a protein material by reducing the temperature of said aqueous slurry to form ice crystal layers in said slurry thereby compressing and molding the protein material of the slurry into layers, and c. heating the frozen slurry to a temperature above about 150° F. and less than a temperature at which the protein will degrade to irreversibly heat set the protein layers and melt said ice crystal layers thereby forming a structured food product having an arrangement of striated protein layers.

10. The method of claim 9 wherein the heating for heat setting the protein layers is for a period of time between about 5 minutes and 1 hour.

11. The method of claim 9 wherein the porteinaceous material is selected from the group of isolated soy protein, emulsified meat materials and mixtures of isolated soy protein with emulsified meat or emulsified raw tuna.

12. The method of claim 9 wherein the proteinaceous slurry is frozen for between 1 and 24 hours to produce the ice crystals.

13. The method of claim 9 wherein the texture of the protein structure formed is modified by the addition of a food grade reagent to the proteinaceous slurry.

* * * * *

UNITED STATES PATENT OFFICE
CERTIFICATE OF CORRECTION

PATENT NO. : 3,870,808
DATED : March 11, 1975
INVENTOR(S) : Robert A. Boyer et al It is certified that error appears in the above-identified patent and that said Letters Patent are hereby corrected as shown below:

In the Abstract, line 16, "to" should read --in--

Column 2, line 7, "in" should read --on--
      lines 21-22, "approximately" should read --approximating--

Column 4, line 54, "product" (first occurrence) should read --produce--
      line 62, "product" should read --produce--

Column 6, line 11, delete "a 20 percent" and insert --isoelectric-- prior to "point"
      line 20, after "a" and prior to "solids" insert --20%--

Column 8, line 25, "products" should read --product--
      line 66, "porteinaceous" should read --proteinaceous--

Signed and sealed this 24th day of June 1975.

(SEAL)
Attest:

RUTH C. MASON
Attesting Officer

C. MARSHALL DANN
Commissioner of Patents
and Trademarks